United States Patent
Gentry (10) Patent No.: US 7,107,588 B2
(45) Date of Patent: Sep. 12, 2006

(54) SYSTEM AND METHOD FOR INSTALLING WINDOW INSTALLER SERVICE WITHOUT REBOOTING

(75) Inventor: Eric Elwood Gentry, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 728 days.

(21) Appl. No.: 09/943,879

(22) Filed: Aug. 31, 2001

(65) Prior Publication Data

US 2003/0046680 A1 Mar. 6, 2003

(51) Int. Cl.
G06F 9/445 (2006.01)
(52) U.S. Cl. .................. 717/176; 717/174; 717/177
(58) Field of Classification Search ........ 717/168–171, 717/172, 174–178
See application file for complete search history.

(56) References Cited

U.S. PATENT DOCUMENTS

| | | | | |
|---|---|---|---|---|
| 5,930,513 A * | 7/1999 | Taylor | | 717/174 |
| 6,006,035 A * | 12/1999 | Nabahi | | 717/175 |
| 6,131,192 A | 10/2000 | Henry | | |
| 6,195,650 B1 * | 2/2001 | Gaither et al. | | 707/1 |
| 6,263,387 B1 * | 7/2001 | Chrabaszcz | | 710/302 |
| 6,266,811 B1 * | 7/2001 | Nabahi | | 717/174 |
| 6,298,427 B1 * | 10/2001 | Beelitz | | 711/173 |
| 6,381,615 B1 * | 4/2002 | Gaither et al. | | 707/200 |
| 6,633,905 B1 * | 10/2003 | Anderson et al. | | 709/219 |
| 6,681,390 B1 * | 1/2004 | Fiske | | 717/173 |
| 6,802,061 B1 * | 10/2004 | Parthasarathy et al. | | 717/173 |
| 6,971,002 B1 * | 11/2005 | Austen et al. | | 713/1 |

OTHER PUBLICATIONS

Minnich, "Give your bootstrap the boot using the operating system to boot the operating system", IEEE, pp. 439-448, 2004.*
Candea et al, "JAGR an autonomous self recoveriing application server", IEEE AMS, pp. 1-10, 2003.*
Valenzuela, "Supporting a windows XP/Red Hat linus dual boot environment", ACM SIGUCCS, pp. 196-199, 2003.*
Seshadri et al, "Pioneer: verifing code intergrity and enforcing untampered code execution on legacy systems", ACM SOSP, pp. 1-16, 2006.*
"Release Notes for McAfee VirusScan v4.5"; Network Associates Technology Inc; Oct. 9, 2000; found Online at www.umbi.umd.edu/computing/softdist/read_memcafeewin4.5sp.txt.
"Alchemy Catalyst 3.1 upgrade process"; Jun. 2, 2002; found Online at www.alchemysoftware.ie/support/catalyst31upg.html ; N.b. file-modified dates.
IBM Technical Disclosure Bulletin; v32, n12, p. 274, May 1990; "Reinstallation with dynamic link libraries in use".
"Windows Installer Service Overview"; Apr. 13, 1999; pp. 1-2.
"The Windows Installer Service"; 1999 Microsoft Corporation; 17 pp.

* cited by examiner

*Primary Examiner*—Anil Khatri

(57) ABSTRACT

When installing the Microsoft Windows™ installer service, the install system suppresses a reboot of the computer device. The install system with reboot suppression includes a load mechanism that loads the install system to a temporary directory. A directory mechanism then sets the path for the install system to the temporary directory, and an executing mechanism executes the install system from the temporary directory. The method suppresses a reboot of the computer device when installing the Microsoft Windows™ installer service and includes the steps of loading the install system to a temporary directory and setting a path for the install system as the temporary directory. Then the install system is executed from the temporary directory.

25 Claims, 10 Drawing Sheets

SYSTEM AND METHOD FOR INSTALLING WINDOW INSTALLER SERVICE WITHOUT REBOOTING

BACKGROUND OF THE INVENTION

1. Field of the Invention

The present invention generally relates to computer software, and more particularly, to an install system and method for installing Microsoft Windows™ installer service on a computer system without rebooting the computer system.

2. Description of Related Art

Currently, most software packages for use in computer systems include an installation program, with the function to install specific vendor programs either on a volatile or non-volatile memory. The installation program might be used to guide a user through the complex procedure of setting up an application for a particular combination of machine and accessories. Installation programs may also be used for software that cannot be copied by normal system commands.

Typically, the Microsoft Windows™ installer service is used to install software programs on computer devices running the Windows™ operating system. If the Windows™ installer service is not resident on the computer device, then prior to a software installation, the Windows™ installer service needs to be previously installed. However, by default, the Microsoft Windows™ installer service will reboot the computer device on which it is installed before it is available to be used to install the desired software. The major disadvantage is that the customer normally will have to reboot the computer device before they can continue with an application software installation. Shutting down the Windows™ operating system on the computer device and restarting the operating system is typically a time consuming operation. Also, after the reboot, the operating system does not necessarily know how to continue the installation of the application software so that many installations the customer would have to restart the installation from scratch, instead of being able to continue the installation from the point previously reached prior to the reboot.

Thus, a heretofore unaddressed need exists in the industry to address the aforementioned deficiencies and inadequacies.

SUMMARY OF THE INVENTION

The present invention provides a system and method for installing Microsoft Windows™ installer service on a computer system without rebooting the computer system. Briefly described, in architecture, the system of the preferred embodiment can be implemented as follows. The install system with reboot suppression includes a load mechanism that loads the install system to a temporary directory. A directory mechanism then sets the path for the install system to the temporary directory, and an executing mechanism executes the install system from the temporary directory.

The present invention can also be viewed as providing one or more methods for installing Microsoft Windows™ installer service on a computer system without rebooting the computer system. In this regard, one method, among others, can be broadly summarized by the following steps. 1) loading the install system to a temporary directory; 2) setting a path for the install system as the temporary directory; and 3) executing the install system from the temporary directory.

Other systems, methods, features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The accompanying drawings incorporated in and forming a part of the specification illustrate several aspects of the present invention, and together with the description, serve to explain the principles of the invention. The elements of the drawings are not necessarily to scale relative to each other, emphasis instead being placed upon clearly illustrating the principles of the invention. In the drawings.

DETAILED DESCRIPTION OF THE PREFERRED EMBODIMENT

The invention will now be described in detail with reference to the drawings. While the invention will be described in connection with these drawings, there is no intent to limit it to the embodiment or embodiments disclosed therein. On the contrary, the intent is to cover all alternatives, modifications, and equivalents included within the spirit and scope of the invention.

In order to improve the current software installation process, the install system and method of the present invention prevents an operating system reboot on the computer device when installing the Microsoft Windows™ installer service. During a first installation, a normal installation is performed that usually would require a reboot; however, the install system of the present invention suppresses the reboot when installing the Microsoft Windows™ installer service. During any second or subsequent installation of the Microsoft Windows™ installer service, the Windows™ installer service is installed into a temporary location without registering it with the operating system. This allows the Microsoft Windows™ installer service to be used for installing software without rebooting.

Figure 1:
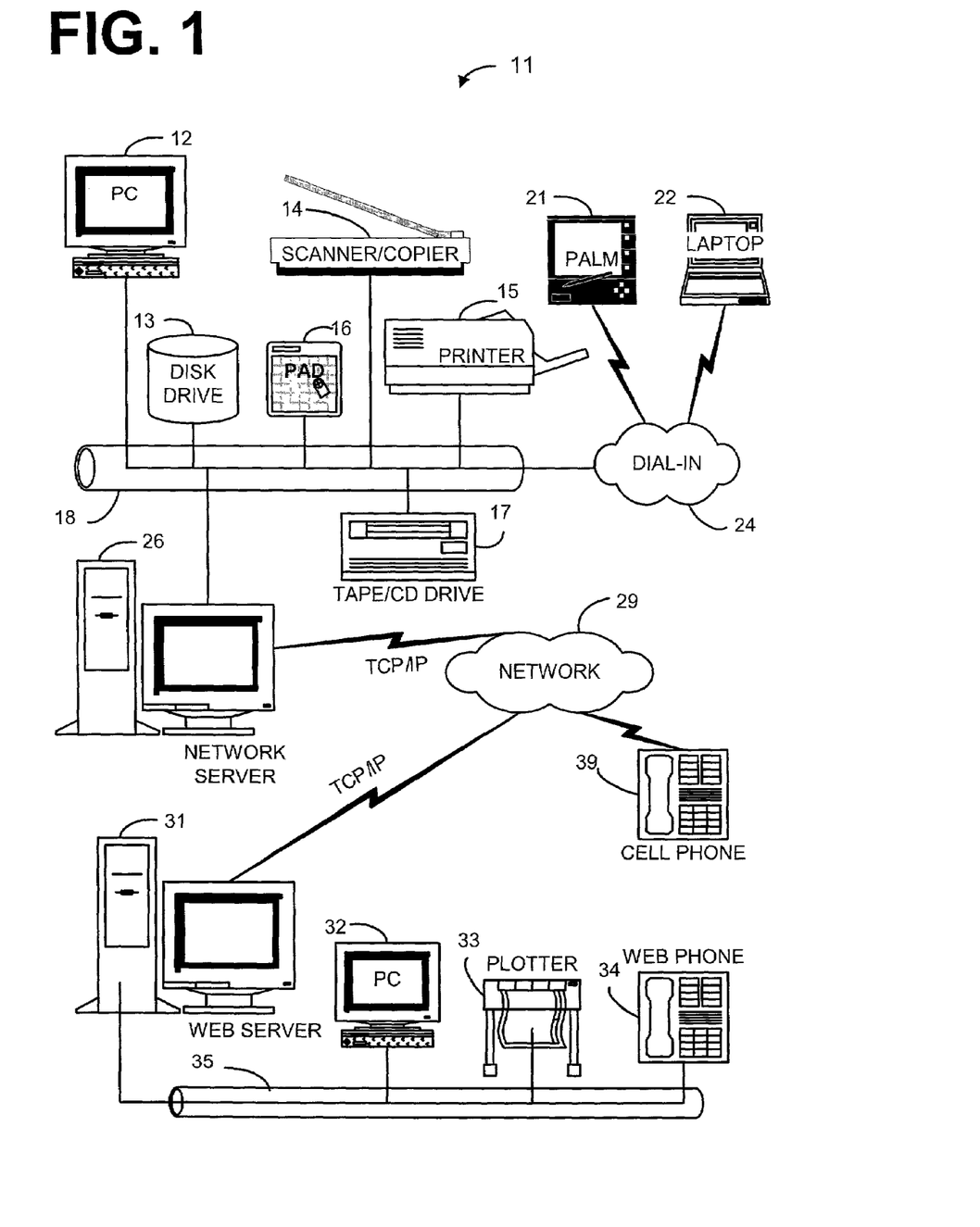
FIG. 1 is a system diagram representative of a nonlimiting set of examples of computer devices that can utilize the install system of the present invention.

Turning now to the drawings, FIG. 1 is a block diagram illustrating an example of the architecture of local and remote computer systems and devices. This exemplar configuration illustrates the flexibility, expandability, and platform independence of the install system with reboot suppression. While the system configuration 11 could take many forms, the diagram of FIG. 1 illustrates a plurality of diverse computers systems 12 and 26 connected to a network 18. Additional computer devices 21 and 22 may similarly be remotely located and in communication with the network 18 through a dial-in network 24 or other network connection. Additional computer systems 31 and 32 may similarly be located and in communication with the network server 26 for access to data on the network server 26 and the web server 31. Computer 32 communicates with the web server 31 over a network 35. Each of the devices in FIG. 1 is uniquely illustrated to emphasize that computer devices and peripherals may comprise a diverse hardware platform. Additional computer peripheral devices including a disk drive 13, scanner copier 14, printer 15, pad input device 16 and tape/CD drive 17 are also connected to the network 18. Network 18 allows the computer device 12 and 26 to access the local peripherals on the network. It is also contemplated by the inventors that the computer devices 21 and 22 can access the local peripherals through a dial-up connection 24 that is further connected to network 18. Through this connection, the computer devices 21 and 22 can access local peripherals 13–17 as well. Other examples of computer type devices include plotter 33, web phone 34 and cell phone 39. Using the install system with reboot suppression of the present invention will permit a user to install and utilize the Microsoft Windows™ installer service without having to reboot the computer device.

Networks 18, 24, 29 and 35 may be, for example, but not limited to, a dial-in network, LAN, WAN, PSTN, Intranet, Internet, PSTN, Ethernet type networks (i.e. also known as 10 BASE 2, 10 BASE 5, 10 BSAEF, 10 BASET, BASE BAN networks), or the like. The network server 26 and computers 12, connected to the network server 26, may communicate with the web server 31 and/or computer 32 over network 29.

Figure 2:
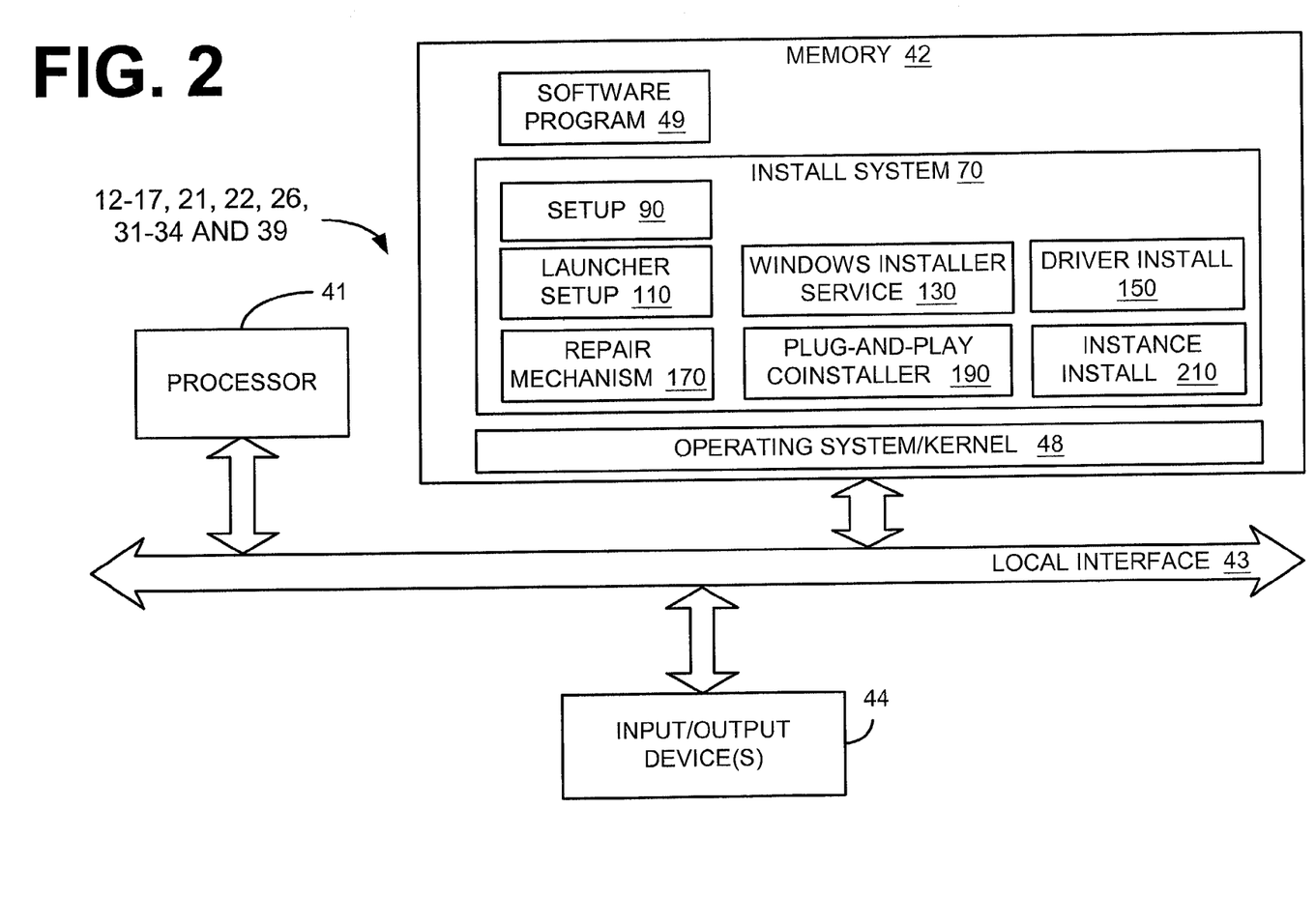
FIG. 2 is a system diagram of an example user system illustrating the install system of the present invention on a computer device.

An example of a computer device that can implement the install system with the reboot suppression of the present invention is shown in FIG. 2. The install system 70 of the invention can be implemented in software (e.g., firmware), hardware, or a combination thereof. In one embodiment, the install system 70 is implemented in software, as an executable program, and is executed by a special or general purpose digital computer, such as a personal computer (PC; IBM-compatible, Apple-compatible, or otherwise), workstation, minicomputer, cell phone, personal digital assistant (PDA), peripheral or mainframe computer.

Generally, in terms of hardware architecture, as shown in FIG. 2, the computer devices 12–17, 21, 22, 26, 31–34 and 39 include a processor 41, memory 42, and one or more input and/or output (I/O) devices 44 that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU) or an auxiliary processor among several processors associated with the computer devices 12–17, 21, 22, 26, 31–34 or 39, and a semiconductor based microprocessor (in the form of a microchip) or a macroprocessor. Examples of suitable commercially available microprocessors are as follows: an 80×86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 42 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example of FIG. 2, the software in the memory 42 includes install system 70, a suitable operating system (O/S) 48, and software program 49. The install system 70 further includes the following components: setup 90, launcher setup 110, Windows™ installer service 130, driver install 150, repair mechanism 170, plug-and-play coinstaller 190, and instance install 210 in memory area 42. These components are herein described in further detail with regard to FIGS. 4–8B.

A non-exhaustive list of examples of suitable commercially available operating systems 48 is as follows: any Windows™ operating system from Microsoft Corporation, U.S.A., a Netware operating system available from Novell, Inc., U.S.A., an operating system available from IBM, Inc., U.S.A., any LINUX operating system available from many vendors or a UNIX operating system, which is available for purchase from many vendors, such as Hewlett-Packard Company, U.S.A., Sun Microsystems, Inc. and AT&T Corporation, U.S.A. The operating system 48 essentially controls the execution of other computer programs, such as the install system 70, and provides scheduling, input-output control, file and data management, memory management, and communication control and related services.

The install system 70 may be a source program, executable program (object code), script, or any other entity comprising a set of instructions to be performed. When a source program, then the program is usually translated via a compiler, assembler, interpreter, or the like, which may or may not be included within the memory 42, so as to operate properly in connection with the O/S 48. Furthermore, the install system 70 can be written as (a) an object oriented programming language, which has classes of data and methods, or (b) a procedure programming language, which has routines, subroutines, and/or functions, for example but not limited to, C, C++, Pascal, BASIC, FORTRAN, COBOL, Perl, Java, and Ada.

The I/O devices 44 may include input devices, for example but not limited to, a keyboard, mouse, scanner, microphone, etc. Furthermore, the I/O devices 44 may also include output devices, for example but not limited to, a printer, display, etc. Finally, the I/O devices 44 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer device 12–17, 21, 22, 26, 31, 34 or 39 is a PC, workstation, or the like, the software in the memory 42 may further include a basic input output system (BIOS) (omitted for simplicity). The BIOS is a set of essential software routines that initialize and test hardware at startup, start the O/S 48, and support the transfer of data among the hardware devices. The BIOS is stored in ROM so that the BIOS can be executed when the computer device 12–17, 21, 22, 26, 31, 34 or 39 is activated.

When the computer device 12–17, 21, 22, 26, 31, 34 or 39 is in operation, the processor 41 is configured to execute software stored within the memory 42, to communicate data to and from the memory 42, and to generally control operations of the computer device 12–17, 21, 22, 26, 31, 34 or 39 pursuant to the software. The install system 70 and the O/S 48 are read, in whole or in part, by the processor 41, perhaps buffered within the processor 41, and then executed.

When the install system 70 is implemented in software, as is shown in FIG. 2, it should be noted that the install system 70 can be stored on virtually any computer readable medium for use by or in connection with any computer related system or method. In the context of this document, a computer readable medium is an electronic, magnetic, optical, or other physical device or means that can contain or store a computer program for use by or in connection with a computer related system or method. The install system 70 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In an alternative embodiment, where the install system 70 is implemented in hardware, the install system 70 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
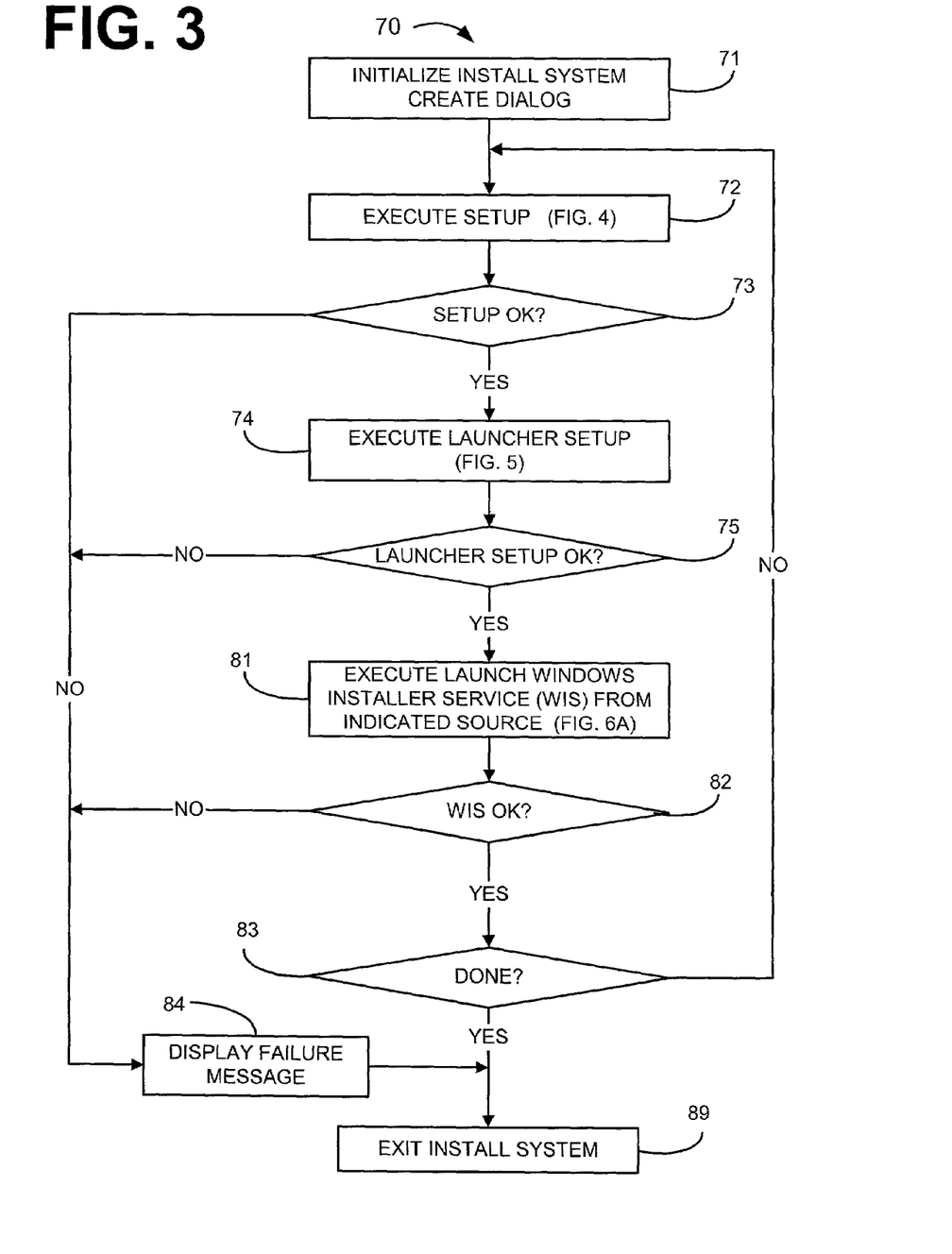
FIG. 3 is a flow chart illustrating an example of the install system of the present invention, as shown in FIG. 2.

Illustrated in FIG. 3 is the flow chart of an example of the install system 70 referenced in FIG. 2. The install system 70 first initializes and creates an input dialog at step 71. This input/output dialog created at step 71 allows the user to communicate with the install system 70 of the present invention. Next, at step 72, the install system 70 executes the setup mechanism. The setup mechanism is herein defined in further detail with regard to FIG. 4. Still referring to FIG. 3, after performing the setup mechanism, the install system 70 then determines if the setup configuration created when executing the setup mechanism is satisfactory in order to execute at step 73. If it is determined at step 73 that the setup created using the setup mechanism at step 72 is not successful, then the install system 70 skips to step 84 to display a failure or other appropriate message to the user and then exits at step 89.

However, if it is determined at step 73 that the setup created by the setup mechanism is successful, the install system 70 then executes the launcher setup mechanism. The launcher setup mechanism is herein defined in further detail with regard to FIG. 5. With reference still to FIG. 3, after performing the launcher process at step 74, the install system 70 then determines if the launcher setup is successfully at step 75. If it is determined at step 75 that the launcher setup is not successfully, the install system 70 then proceeds to display the failure message at step 84 and exits at step 89.

However, if it is determined at step 75 that the launcher setup is successful, then the install system 70 executes the Windows™ installer service at step 81. The Windows™ installer service is launched from the source indicated during the processing of the launcher setup mechanism (step 74). The launch Windows™ installer service is herein defined in further detail with regard to FIG. 6A. After performing the launch Windows™ installer service, the install system 70 then determines if the Windows™ installer service executed successfully at step 82. If it is determined that the Windows™ installer service did not execute successfully, then the install system 70 proceeds to step 84 to display the failure message detailing why the Windows™ installer service did not perform correctly and then exits at step 89.

However, if it is determined at step 82 that the Windows™ installer service did execute successfully, then the install system 70 then determines if there are more pieces of hardware to be installed at step 83. If it is determined at step 83 that there are more pieces of hardware to be installed, the install system 70 then returns to repeat step 72 through 83. However, if it is determined at step 83 that there are no more pieces of hardware to be installed, then the install system 70 then exits at step 89.

Figure 4:
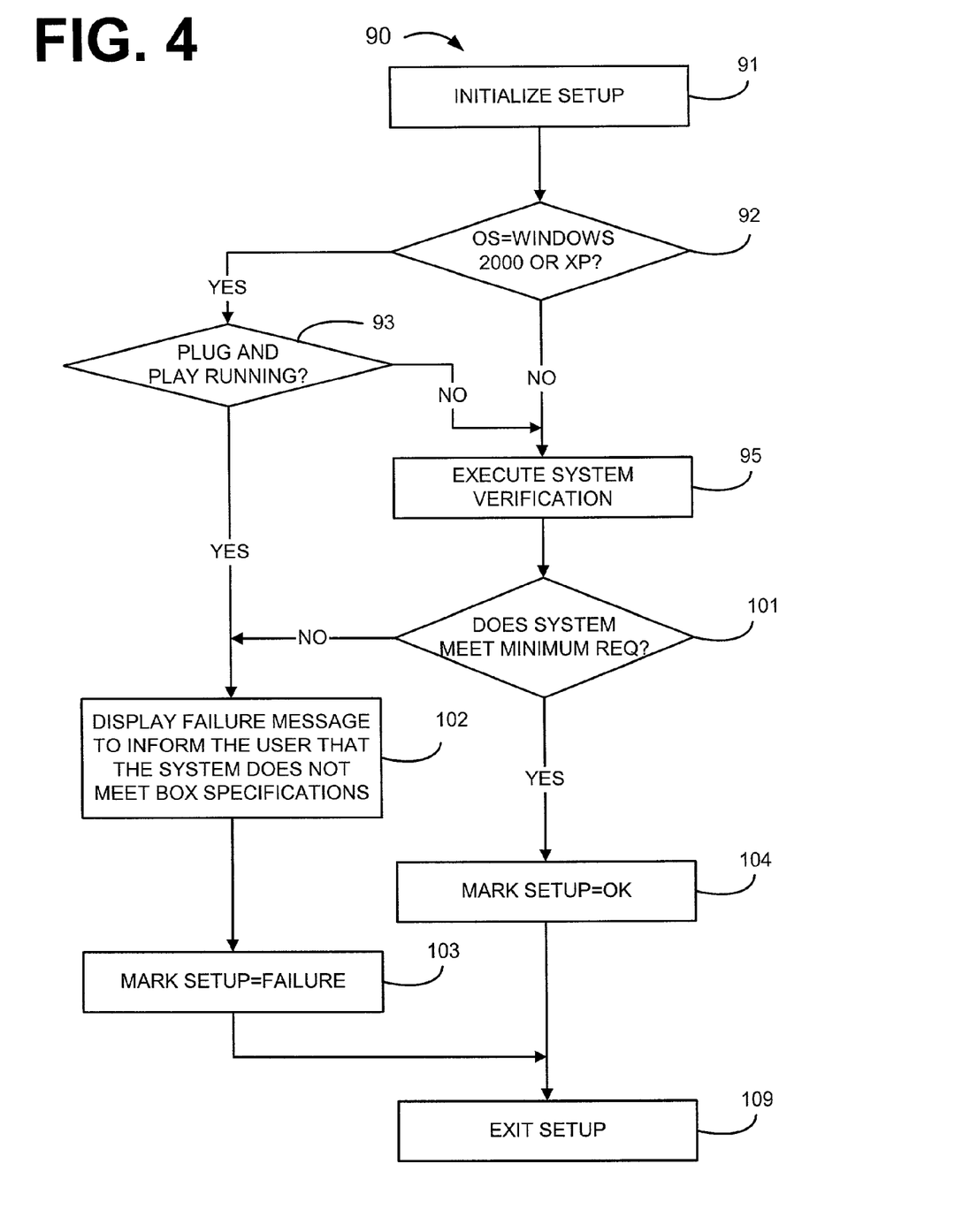
FIG. 4 is a flow chart illustrating an example of the setup mechanism utilized by the install system, as shown in FIGS. 2 and 3.

Illustrated in FIG. 4 is a flow chart of a nonlimiting example of the setup mechanism 90 that is utilized in the install system 70 of the present invention. The setup mechanism 90 performs the initial verification that the computer device 12–17, 21, 22, 26, 31–34 and 39 (FIG. 1 and FIG. 2) meets the minimum system requirements for the install system 70 to execute properly.

First, the setup mechanism 90 is initialized at step 91. At step 92, the setup mechanism determines if operating system for the computer device is Windows™ 2000 or Windows™ XP. If it is determined that the operating system for the computer device for which the setup mechanism 90 is being run is Windows™ 2000 or XP, then the setup mechanism 90 next determines at step 93 if a default plug-and-play process is running. If it is determined at step 93 that a default plug-and-play process is running, then the setup mechanism 90 displays a failure message to inform the user that the computer device system does not meet box specifications at step 102. Box specifications indicate the minimum system resources needed to install and support the hardware device being installed. At step 103, the setup mechanism 90 then marks the setup as being equal to a failure and exits the setup at step 109.

However, if it is determined at step 93 that a plug-and-play process is not running or if it is determined at step 92 that the operating system for the device being setup is not Windows™ 2000 or Windows™ XP, then the setup mechanism 90 executes the system verification at step 95. The system verification step 95 determines if the system specifications found from the operating system meet or exceed the system requirements for installation. Examples of the system requirements include, but are not limited to: amount of RAM, amount of hard drive space, supported operating system, high enough screen resolution, enough screen colors, etc.

Next at step 101, the setup mechanism 90 determines if the computer device system meets the minimum requirements. If it is determined that the computer device system does not meet the minimum requirements at step 101, the setup mechanism 90 proceeds to step 102 to display a failure message to inform the user that the system does not meet the box specifications, sets the setup flag equal to a failure at step 103 and then exit at step 109. However, if it is determined at step 101 that the system does meet the minimum requirements, then the setup mechanism 90 then marks the setup equal to OK at step 104 and then exits at step 109.

Figure 5:
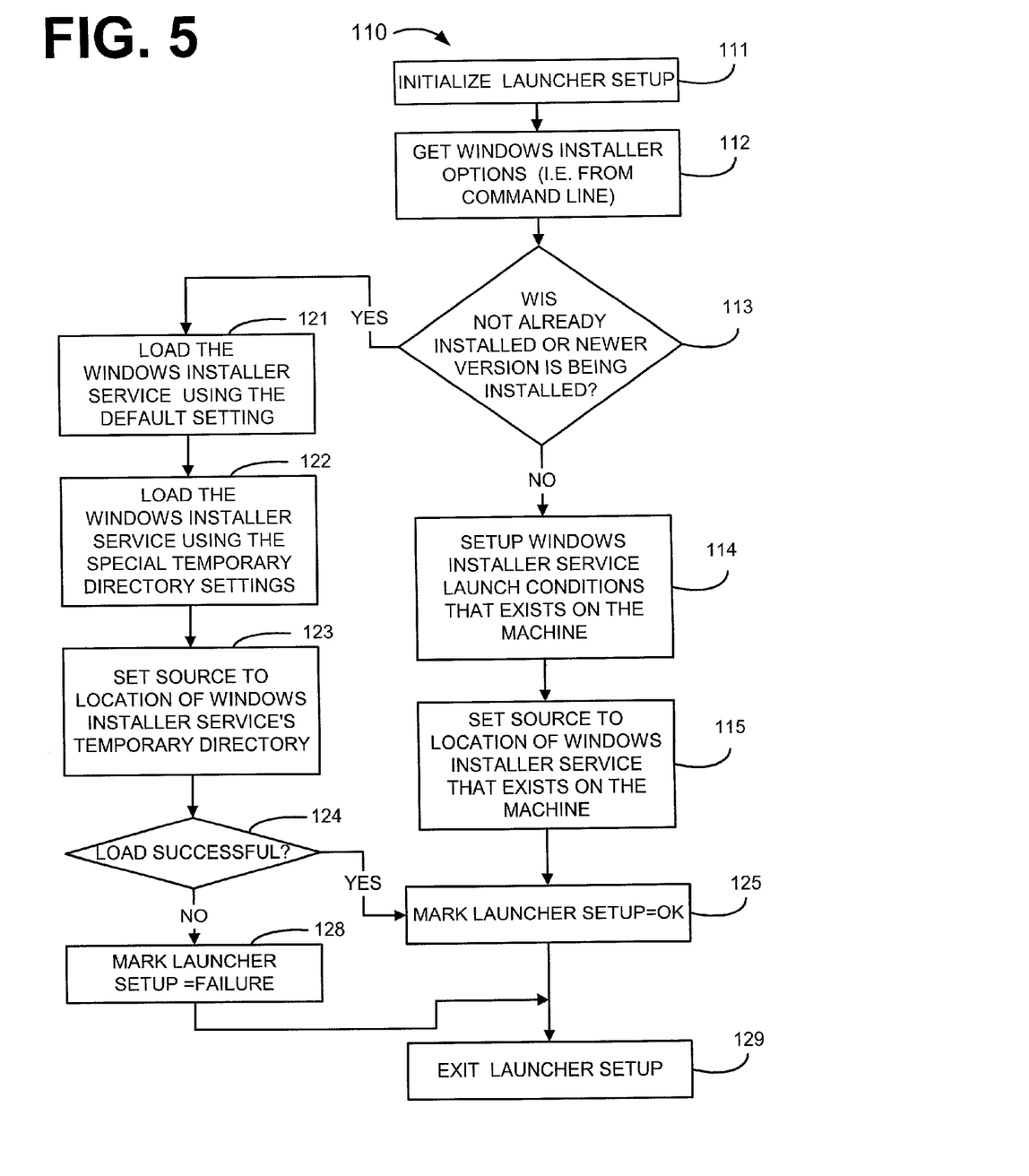
FIG. 5 is a flow chart illustrating an example of the launcher setup mechanism utilized by the install system, as shown in FIGS. 2 and 3.

Illustrated in FIG. 5 is a flow chart of an example of the launcher setup mechanism 110 utilized in the install system 70 of the present invention. The launcher setup mechanism 110 sets up the options and configuration in which to execute the Windows™ installer service.

First, the launcher setup mechanism 110 is initialized at step 111. At step 112, the launcher setup mechanism 110 gets the Windows™ installer options to be utilized during the install process. The options for the Windows™ installer service can be obtained either from the command line or from a default configuration. Examples of options for the Windows™ installer service include but are not limited to: install language and install location.

At step 113, the launcher setup mechanism 110 determines if the Windows™ installer service is not already installed or if a newer version of the Windows™ installer service is to be installed. If it is determined at step 113 that the Windows™ installer service is already installed and a newer version is not being installed, then the launcher setup 110 sets up the Windows™ installer service launch conditions that exist on the computer device at step 114. This step occurs when installing software other than the Windows™ installer service. The Windows™ installer service launch conditions include, but are not limited to, the command line for the Windows™ installer service, install language, and install location. At step 115, the launcher setup 110 sets the source (i.e. absolute path) for the Windows™ installer service to be run to the location of the Windows™ installer service that currently exists on the computer device. After setting the source of the Windows™ installer service, the launcher setup mechanism 110 then marks the launcher setup equal to successfully at step 125 and exits at step 129.

However, if it is determined at step 113 that the Windows™ installer service has not been already installed or that a newer version is being installed, then the launcher setup 110 proceeds to step 121. At step 121, the launcher setup 110 loads the chosen Windows™ installer service using the default settings. Running the Windows™ installer service using the default settings will require a reboot of the computer device in order to operate correctly. However, in the illustrated example, this reboot is suppressed in order to prevent a reboot interruption of the load process. One way this is accomplished is by using the "/Q" option on the command line for the Windows™ installer service. The use the default setting by the Windows™ installer service provides for subsequent load and uninstall operations, and operation robustness in case of a failure during the temporary directory install operation.

In the preferred embodiment, the Windows™ installer service is loaded from the portable media such as, but not limited to, CD, diskette, or some other type of non-volatile memory source. In an alternative embodiment, the Windows™ installer service can be loaded from a remote location utilizing a modem or other type of communication device connected to any network, such as but not limited to those shown and described in connection with FIG. 1.

At step 122, the launcher setup 110 then also loads the Windows™ installer service into a temporary directory. Running the Windows™ installer service using the temporary directory will not require a reboot of the computer device to operate correctly. Loading the Microsoft Windows™ installer service to a temporary directory allows the install system 7 to instruct the operating system not to reboot before using the Windows™ installer service. In addition, the install system 7 is also able to instruct the operating system to ignore the Windows™ installer service system DLLs that are always in memory when the operating system is running. In the illustrated example, these functions can be accomplished by copying the files to the temporary directory using an indicated full temporary path. One way this is accomplished is by using the "/C/T:<full temp path>" options on the command line for the Windows™ installer service. This prevents the operating system from "realizing" or "using" the temporary path as the standard or default path for involving the Windows™ installer service. This also prevents the operating system from requiring a reboot. The Windows™ installer service in the temporary directory is then used for the rest of the installation by utilizing the same temporary path for launching the Windows™ installer service.

At step 123, the launcher setup 110 sets the source (i.e. absolute path) for the Windows™ installer service to be run at the location of the temporary directory. At step 124, the launcher setup mechanism 110 determines if the load is successful. If it is determined at step 124 that the load was not successful, then the launcher setup mechanism 110 marks the launcher setup equal to failure at step 128 and then proceeds to exit at step 129. However, if it is determined at step 124 that the load was successful, then the launcher setup mechanism 110 marks the launcher setup equal to OK at step 125 and then proceeds to exit at step 129.

Figure 6A:
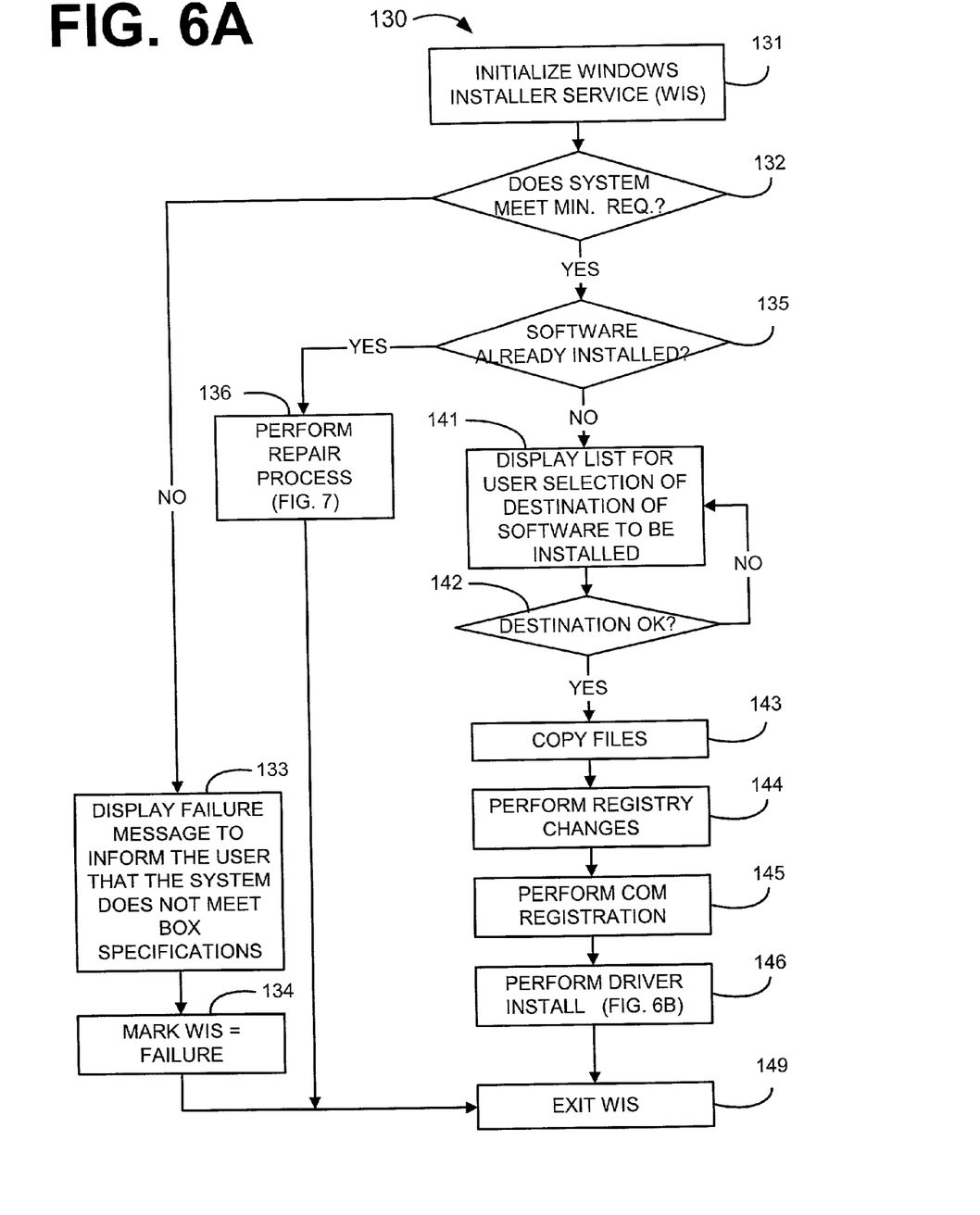
FIG. 6A is a flow chart illustrating an example Windows™ installer service utilized by the install system, as shown in FIGS. 2 and 3.

Illustrated in FIG. 6A is a flow chart of a nonlimiting example of the Windows™ installer service 130 utilized in the install system 70 of the present invention. First, the Windows™ installer service 130 is initialized at step 131. At step 132, the Windows™ installer service 130 determines if the system meets the minimum requirements. If it is determined at step 132 that the system does not meet the minimum requirements for installation, then the Windows™ installer service 130 displays a failure or other suitable message to inform the user that the system does not meet the box specifications of step 133. The Windows™ installer service then marks the Windows™ installer service operation equal to a failure at step 134 and exits at step 149.

However, if it is determined in step 132 that the system does meet the minimum requirements, then the Windows™ installer service 130 determines if the software to be installed is already installed at step 135. If it is determined at step 135 that the software to be installed is already installed, then the Windows™ installer service 130 proceeds to step 136 to perform the repair mechanism. The repair mechanism is herein defined in further detail with regard to FIG. 7. After performing the repair mechanism, the Windows™ installer service then exits at step 149.

However, if it determined at step 135 that the software is not already installed, then the Windows™ installer service displays a list for the users selection of the source and destination of the software to be installed at step 141. After allowing the user to select the source and destination for the software to be installed, the Windows™ installer service 130 determines that the source and destination is successfully at step 142. If it is determined at step 142 that either the source or destination is not successfully, then the Windows™ installer service 130 returns to repeat step 141 and 142. However, if it determined at step 142 that either the source and destination for the software to be installed is successfully, then the Windows™ installer service proceeds to copy files at step 143.

At step 144, the Windows™ installer service 130 performs the registry changes and performs the COM registration at step 145. At step 146, the Windows™ installer service 130 performs the driver install mechanism of the present invention. The driver install mechanism of the present invention is herein defined in further detail with regard to FIG. 6B. After performing the driver install mechanism at step 146, the Windows™ installer service 130 then exits at step 149.

Figure 6B:
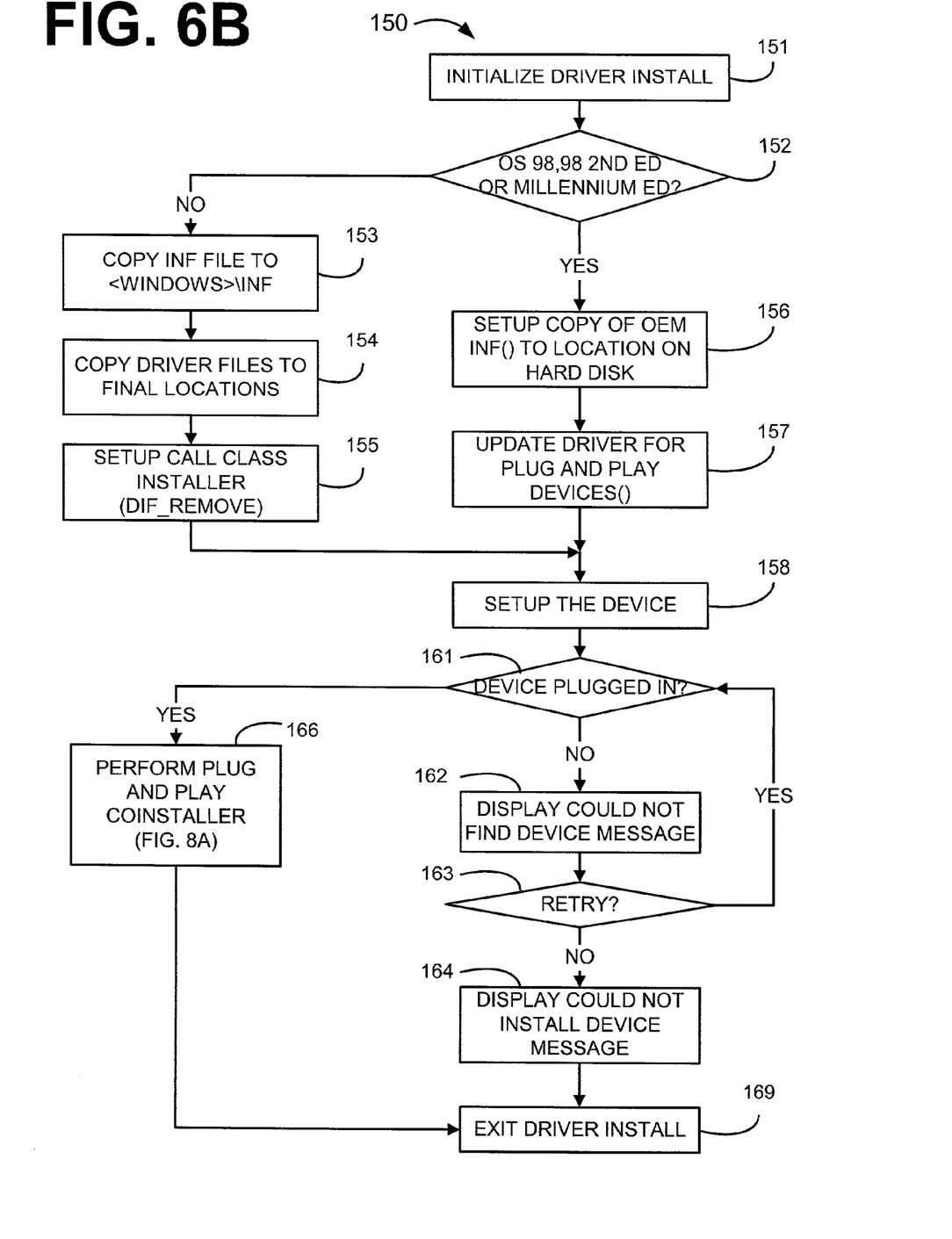
FIG. 6B is a flow chart illustrating an example driver install mechanism utilized by the Windows™ installer service, as shown in FIGS. 2, 3 and 6A.

Illustrated in FIG. 6B is a flow chart of an example of the driver install mechanism 150 of the present invention, utilized in the install system 70. The driver install mechanism 150 enables a user to install hardware to the computer device using the Windows™ installer service 130 (FIG. 6A).

First, the driver install mechanism 150 is initialized at step 151. Next, at step 152, the driver install mechanism 150 determines if the operating system on the computer device is Windows™ 98, Windows™ 98 2Ed or Windows™ Millenium Edition. If it is determined at step 152 that the current operating system is not Windows™ 98, Windows™ 98 2Ed, or Millenium Edition, then the driver install mechanism 150 proceeds to step 153 to copy the manufacturer information installation file (INF) file to the Windows™ INF directory. At step 154, the driver files from the indicated source are copied to the final destination location at step 154. At step 155, the driver install mechanism 150 sets up the call class installer. This step removes the operating system provided drivers and sets up the operating system to use the installed drivers. After performing the call class installer, the driver install mechanism 150 then proceeds to step 158.

However, if it is determined at step 152 that the operating system is not Windows™ 98, Windows™ 98 2Ed, or Millenium Edition, the driver install mechanism 150 then proceeds to step 156 to setup the copy of the original equipment manufacturer information installation file (INF) to a destination location. In the preferred embodiment, this INF is in non-volatile storage, such as a hard disk or BIOS. After setting up the copy of the original equipment manufacturer INF to the destination location, then the driver install mechanism 150 then updates the driver for the plug-and-play devices at step 157.

At step 158, the driver install mechanism 150 then proceeds to setup the device. This step includes sending a message to the user to plug in the device to the computer. At step 161, the driver install mechanism 150 determines if the device to have drivers installed is plugged in. If it is determined at step 161 that the device is not plugged in, then the driver install mechanism 150 displays a message to the user that it could not define the device and prompts the user to indicate if the check for the device is to be retried at step 163. If it is determined at step 163 that a retry of the device check is to occur, the driver install mechanism 150 returns to repeat step 161. However, if it is determined at step 163 that a retry is not to occur, then the driver install mechanism 150 displays a message that it could not find the install device at step 164 and exits at step 169.

However, if it is determined at step 161 that the device is plugged in, the driver install mechanism 150 performs the plug-and-play coinstaller at step 166. The plug-and-play coinstaller is herein defined in further detail with regard to FIG. 8A. After performing the plug-and-play coinstaller, the driver install mechanism 150 then proceeds to exit at step 169.

Figure 7:
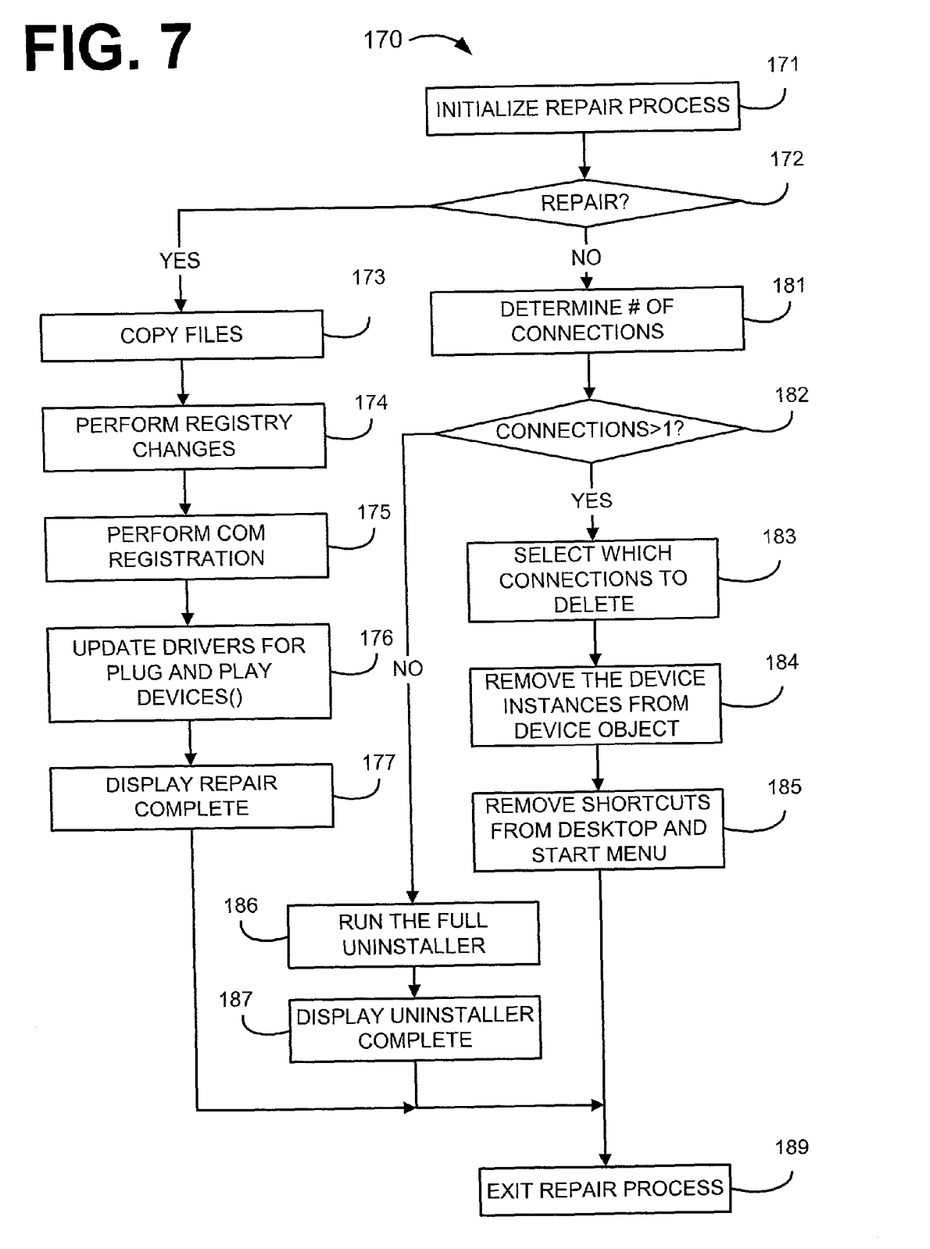
FIG. 7 is a flow chart illustrating an example of the repair mechanism utilized by the Windows™ installer service process in the install system, as shown in FIGS. 2, 3 and 6A.

Illustrated in FIG. 7 is a flow chart of a nonlimiting example of the repair mechanism 170 utilized in the install system 70 of the present invention. The repair mechanism 170 repairs previous software installations by updating a driver(s) or removing multiple connections.

First, the repair mechanism 170 is initialized at step 171. At step 172, it is determined if the operation to be performed is a repair. If it is determined at step 172 that a repair is to be performed, then the repair mechanism 170 proceeds to copy files from the indicated source to the indicated destination at step 173. At step 174, the repair mechanism 170 performs the required registry changes and performs the COM registration at step 175. At step 176, the repair mechanism 170 updates drivers for the plug-and-play devices and displays a message that the repair is complete at step 177. The repair mechanism 170 exits at step 189.

However, if it is determined at step 172 that a repair operation is not to occur, then the repair mechanism 170 then determines the number of connections at step 181. At step 182, it is then determined if the number of connections is greater than one. If it is determined at step 182 that the connections are equal to or less than one, then the repair mechanism 170 proceeds to step 186 to run the full uninstaller mechanism to remove the drivers for the indicated device having more than one connection. During the full uninstaller mechanism, the software is removed from the system, and the user is prompted to remove the device from the system. The drivers are also disable by the operating system when the device is disconnected from the system. At step 187, the repair mechanism 170 then displays an uninstaller complete message and exits at step 189.

However, if it is determined at step 182 that the number of connections is greater than one, then the repair mechanism 170 selects which connections are to be deleted at step 183 and removes the device instance from the device object at step 184. At step 185, the repair mechanism 170 removes shortcuts from the desktop and start menu and exits at step 189.

Figure 8A:
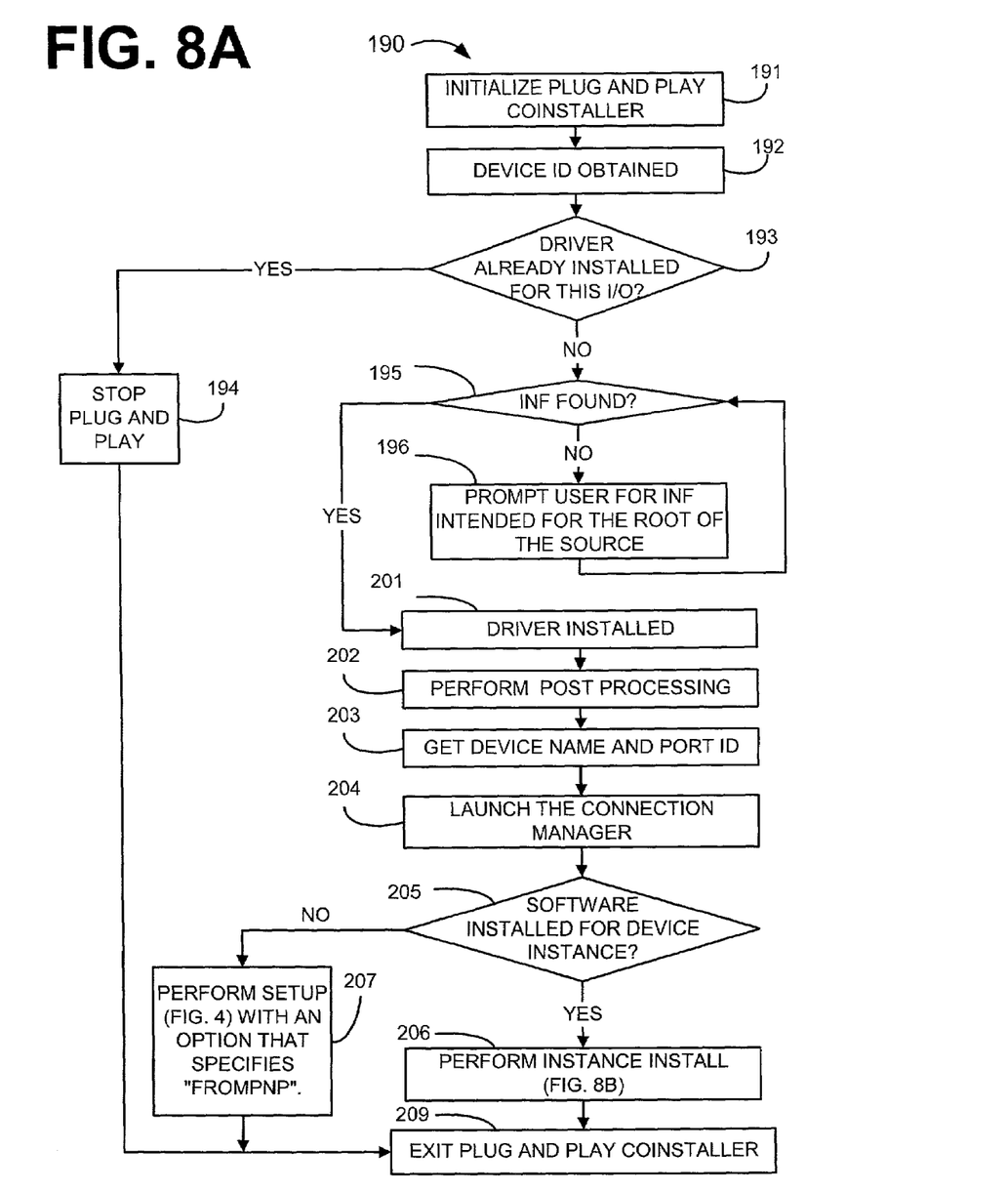
FIG. 8A is a flow chart of an example of the plug-and-play coinstaller utilized in the driver install mechanism in the install system of the present invention, as shown in FIGS. 2, 3 and 6B.

Illustrated in FIG. 8A is a nonlimiting example of the plug-and-play coinstaller 190 utilized in the install system 70 of the present invention. The plug-and-play coinstaller 190 actually installs the hardware drivers on the computer device 12–17, 21, 22, 26, 31–34 or 39 (FIG. 1 and FIG. 2) for the install system 70.

First, the plug-and-play coinstaller 190 is initialized in step 191. At step 192, the device identification (ID) is obtained. At step 193, the plug-and-play coinstaller 190 determines if the driver is already installed for this device. If it is determined that the driver is already installed for this device, the plug-and-play coinstaller 190 proceeds to step 194 to stop the plug-and-play process and then exits at step 209. However, if it is determined at step 193 that the driver is not already installed for this device, then the plug-and-play coinstaller 190 then determines if the INF file directory is found. If it determined at step 195 that the INF file is not found, then the plug-and-play coinstaller 190 prompts the user for the INF intended for the root of the source at step 196. After receiving the user input for the INF intended from the root of the source, the plug-and-play coinstaller 190 then returns to determine if the INF source file is found.

If it is determined in step 195 that the INF source file is found, then the plug-and-play coinstaller 190 then proceeds to step 201 to install the driver. At step 202, the plug-and-play coinstaller 190 performs the post processing on the driver in the operating system.

Next, at step 203, the plug-and-play coinstaller 190 gets the name and port ID. The device name and port ID come from the operating system 48 that passes the information to the plug-and-play coinstaller 190. At step 204, the plug-and-play coinstaller 190 launches the connection manager. The connection manager connects the software being installed to the device port.

At step 205, the plug-and-play coinstaller 190 determines if software is being installed for this device instance. If it is determined in step 205 that software is not installed for the device instance, then the plug-and-play coinstaller 190 the proceeds to step 207 to perform the setup mechanism 90 with the option that specifies the caller as the plug-and-play coinstaller 190. The setup mechanism 90 has been previously defined herein above with regard to FIG. 4. After performing this setup, the plug-and-play coinstaller 190 then exits the step 209.

If it is determined however at step 205 that software is to be installed to the device instance, then the plug-and-play coinstaller 190 then performs the instance install mechanism at step 206. The instance install mechanism is herein defined in further detail with regard to FIG. 8B. After performing the instance install mechanism, the plug-and-play coinstaller 190 then exits at step 209.

Figure 8B:
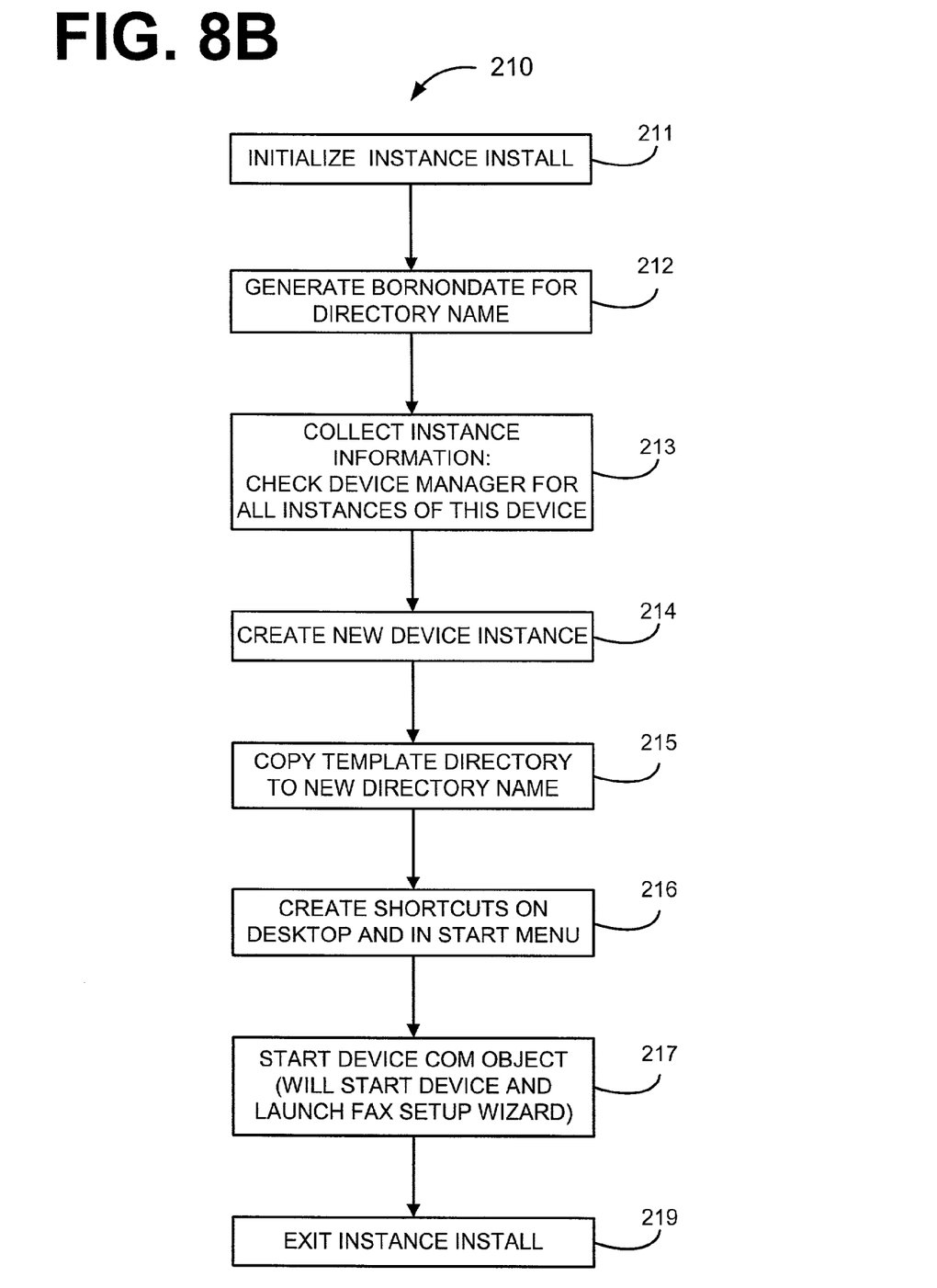
FIG. 8B is a flow chart of an example of the instance install mechanism utilized in the plug-and-play coinstaller within the install system, as shown in FIGS. 2, 3 and 8A.

Illustrated in FIG. 8B is a flow chart of a nonlimiting example of the instance install mechanism 210 utilized by the plug-and-play coinstaller 190 within the install system 70 of the present invention. The instance install mechanism 210 creates the new device instance for the hardware drivers installed on the computer device 12–17, 21, 22, 26, 31–34 or 39 (FIG. 1 and FIG. 2) by the install system 70.

First, the instance install mechanism 210 is initialized in step 211. At step 212, the instance install mechanism 210 generates a born-on-date for the directory name for the instance information. At step 213, the instance install mechanism 210 collects the instance information. The instance information is collected utilizing the check device manager for all instances of this device. The preferred embodiment performs this function by using a COM function call into the installed software to determine the number of devices already currently connected to the installed software. At step 214, the instance install mechanism 210 then creates a new device instance. Next, at step 215, the instance install mechanism 210 copies the template directory to the new directory name, and creates shortcuts on the desktop and in the start menu at step 216. At step 217, the instance install mechanism 210 starts the device COM object. The start of the device COM object starts the device. The start of the device COM object also launches a fax setup wizard. The fax setup wizard is a routine to initialize the installed software to be able to send and receive messages and information from the newly connected device. The instance install mechanism 210 then exits at step 219.

The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An install system with reboot suppression used in conjunction with a computer system, the install system comprising:
   means for loading the install system to a temporary directory;
   means for setting a path for the install system as the temporary directory; and
   means for executing the install system from the temporary directory.

2. The system of claim 1, wherein the loading means further comprises:
   means for loading the install system from a non-volatile memory source.

3. The system of claim 1, wherein the loading means further comprises:
   means for loading the install system from a network source.

4. The system of claim 1, wherein the loading means further comprises:
   means for loading the install system to a default directory.

5. The system of claim 4, wherein the default directory loading means uses a default setting to load the install system to the default directory.

6. A method for installing an install system on a computer system, the method comprising:
   loading the install system to a temporary directory;
   setting a path for the install system as the temporary directory; and
   executing the install system from the temporary directory without rebooting an operating system.

7. The method of claim 6, wherein the loading further comprises:
   loading the install system from a non-volatile memory source.

8. The method of claim 6, wherein the loading further comprises:
   loading the install system from a network source.

9. The method of claim 6, wherein the loading further comprises:
   loading the install system to a default directory.

10. The method of claim 9, wherein the loading the install system in the default directory further comprises:
    using default setting to load the install system.

11. A computer readable medium having an install system with reboot suppression used in conjunction with a computer system, comprising:
    logic for loading the install system to a temporary directory;
    logic for setting a path for the install system as the temporary directory; and
    logic for executing the install system from the temporary directory.

12. The computer readable medium of claim 11, wherein the install system is further comprises:
    logic for loading the install system from a non-volatile memory source.

13. The computer readable medium of claim 11, wherein the install system is further comprises:
    logic for loading the install system from a network source.

14. The computer readable medium of claim 11, wherein the install system is further comprises:
    logic for for loading the install system to a default directory.

15. The computer readable medium of claim 14, wherein the install system is further comprises:

logic for using default setting to load the install system to the default directory.

16. An install system with reboot suppression used in conjunction with a computer system, the install system apparatus comprising:
    load mechanism that loads the install system to a temporary directory;
    directory mechanism that sets a path for the install system to the temporary directory; and
    executing mechanism that executes the install system from the temporary directory.

17. The system of claim 16, wherein the load mechanism further comprises:
    logic configured to load the install system from a non-volatile memory source.

18. The system of claim 16, wherein the load mechanism further comprises:
    logic configured to load the install system from a network source.

19. The system of claim 16, wherein the load mechanism further comprises:
    logic configured to load the install system to a default directory.

20. The system of claim 19, wherein the logic configured to load the install system to the default directory uses default setting to load the install system to the default directory.

21. A method for installing an install system on a computer system having an operating system, the method comprising:
    loading the install system to a temporary directory without registering the install system with the operating system; and
    executing the install system from the temporary directory without restarting the operating system.

22. The method of claim 21, further comprising:
    loading the install system to a default directory; and
    registering the install system with the operating system.

23. The method of claim 21, wherein the executing further comprises:
    executing the install system to install a software program on the computer system.

24. The method of claim 23, wherein the installing further comprises:
    installing the software program from a network source.

25. The method of claim 23, wherein the installing further comprises:
    installing the software program from a non-volatile memory source.

* * * * *

UNITED STATES PATENT AND TRADEMARK OFFICE
CERTIFICATE OF CORRECTION

PATENT NO. : 7,107,588 B2 Page 1 of 1
APPLICATION NO. : 09/943879
DATED : September 12, 2006
INVENTOR(S) : Eric Elwood Gentry It is certified that error appears in the above-identified patent and that said Letters Patent is hereby corrected as shown below:

In column 12, line 64, in Claim 14, after "logic for" delete "for".

Signed and Sealed this

Twentieth Day of January, 2009

JON W. DUDAS
*Director of the United States Patent and Trademark Office*